United States Patent
Coon et al.

(10) Patent No.: US 7,634,621 B1
(45) Date of Patent: Dec. 15, 2009

(54) REGISTER FILE ALLOCATION

(75) Inventors: Brett W. Coon, San Jose, CA (US);
John Erik Lindholm, Saratoga, CA (US); Gary Tarolli, Concord, MA (US);
Svetoslav D. Tzvetkov, Irvine, CA (US);
John R. Nickolls, Los Altos, CA (US);
Ming Y. Siu, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 424 days.

(21) Appl. No.: 11/556,677

(22) Filed: Nov. 3, 2006

Related U.S. Application Data

(63) Continuation-in-part of application No. 10/889,730, filed on Jul. 13, 2004, now Pat. No. 7,339,592.

(51) Int. Cl.
*G06F 12/00* (2006.01)
(52) U.S. Cl. ...................................................... 711/149
(58) Field of Classification Search .................... None
See application file for complete search history.

(56) References Cited

U.S. PATENT DOCUMENTS

| | | | | |
|---|---|---|---|---|
| 5,179,685 A * | 1/1993 | Nojiri | ........................... | 712/41 |
| 5,809,547 A * | 9/1998 | Taoda | ........................... | 711/165 |
| 6,381,668 B1 * | 4/2002 | Lunteren | ........................... | 711/5 |
| 6,988,154 B2 * | 1/2006 | Latta | ........................... | 710/240 |
| 7,296,112 B1 * | 11/2007 | Yarlagadda et al. | ........................... | 711/105 |
| 7,339,592 B2 * | 3/2008 | Lindholm et al. | ........................... | 345/543 |
| 2006/0195707 A1 * | 8/2006 | Rychlik | ........................... | 713/300 |
| 2007/0153015 A1 * | 7/2007 | You-Ming | ........................... | 345/557 |

\* cited by examiner

*Primary Examiner*—Hiep T Nguyen
(74) *Attorney, Agent, or Firm*—Townsend and Townsend and Crew LLP

(57) ABSTRACT

Circuits, methods, and apparatus that provide the die area and power savings of a single-ported memory with the performance advantages of a multiported memory. One example provides register allocation methods for storing data in a multiple-bank register file. In a thin register allocation method, data for a process is stored in a single bank. In this way, different processes use different banks to avoid conflicts. In a fat register allocation method, processes store data in each bank. In this way, if one process uses a large number of registers, those registers are spread among the banks, avoiding a situation where one bank is filled and other processes are forced to share a reduced number of banks. In a hybrid register allocation method, processes store data in more than one bank, but fewer than all the banks. Each of these methods may be combined in varying ways.

24 Claims, 15 Drawing Sheets

| Bank 0 | Bank 1 | Bank 2 | Bank 3 |
|--------|--------|--------|--------|
|        |        |        |        |
| 404B   | 405B   | 406B   | 407B   |
| 400B   | 401B   | 402B   | 403B   |
| 404A   | 405A   | 406A   | 407A   |
| 400A   | 401A   | 402A   | 403A   |

Figure 4E

| Bank 0 | Bank 1 | Bank 2 | Bank 3 |
|--------|--------|--------|--------|
|        |        |        |        |
| 417B   | 414B   | 415B   | 416B   |
| 413B   | 410B   | 411B   | 412B   |
| 414A   | 415A   | 416A   | 417A   |
| 410A   | 411A   | 412A   | 413A   |

Figure 4F

REGISTER FILE ALLOCATION

BACKGROUND

One or more aspects of the invention generally relate to data processing, and more particularly to register allocation in multiple-bank, single-port memories.

The demand for increased realism in computer graphics for games and other applications has been steady for some time now and shows no signs of abating. This has placed stringent performance requirements on computer system components, particularly graphics processors. For example, to generate improved images, an ever increasing amount of data needs to be processed by a graphics processing unit. In fact, conventional processing techniques are not up to this task and need to be replaced by improved processing techniques.

One such improved technique employs multiple single-instruction, multiple-data processors. These new techniques allow these processors to simultaneously execute hundreds of threads.

Current data processing includes systems and methods developed to execute program instructions, including instructions without operands, or with one or more operands. The operands are stored in register files within the processor for access during the execution of a program. Some program instructions, such as multiply and multiply-accumulate, specify two or more operands. Conventionally, a register file is implemented using a multiported memory so that two or more locations, each location storing an operand, may be read in a single clock cycle.

Compared with a multiported memory, a single ported memory consumes less die area and power. However, unlike a multiported memory, only a single location may be read in each clock cycle. Therefore, two or more clock cycles are needed to acquire the operands needed to execute some program instructions, reducing performance compared with a multiported memory.

Accordingly, it would be desirable to provide memory structures and register allocation methods that provide the die and power savings of a single-ported memory while retaining the performance advantages of a multiported memory.

SUMMARY

Accordingly, embodiments of the present invention provide circuits, methods, and apparatus that provide the die area and power savings of a single-ported memory with the performance advantages of a multiported memory.

An exemplary embodiment of the present invention provides register allocation methods for storing data in a register file or other memory having multiple banks. In a specific embodiment, each bank is a single-ported memory, though in other embodiments, other numbers of ports may be used. In one register allocation method referred to as a thin register allocation, data for a process is stored in a single bank. In this way, different processes can be executed, where each processes uses a different bank to avoid bank conflicts during read and write operations.

This embodiment also provides another register allocation method referred to as a fat register allocation. In this method, each process stores data in each bank. In this way, if one process uses a large number of registers, the registers are spread among the different banks, instead of filling up one bank and thereby forcing the other processes to share a reduced number of banks.

This embodiment also provides a hybrid register allocation method where each process stores data in more than one bank, but fewer than all the banks. Each of these register allocation methods may be combined in different ways depending on the needs of the processes being executed. The data stored in this and the other register allocation methods may be operands for use in executing a process.

Various embodiments of the present invention may incorporate one or more of these or the other features described herein. A better understanding of the nature and advantages of the present invention may be gained with reference to the following detailed description and the accompanying drawings.

BRIEF DESCRIPTION OF THE DRAWINGS

FIG. 4E is an exemplary embodiment of an assignment of registers for threads in accordance with one or more aspects of the present invention;

FIG. 4F is another exemplary embodiment of an assignment of registers for threads in accordance with one or more aspects of the present invention;

DESCRIPTION OF EXEMPLARY EMBODIMENT

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
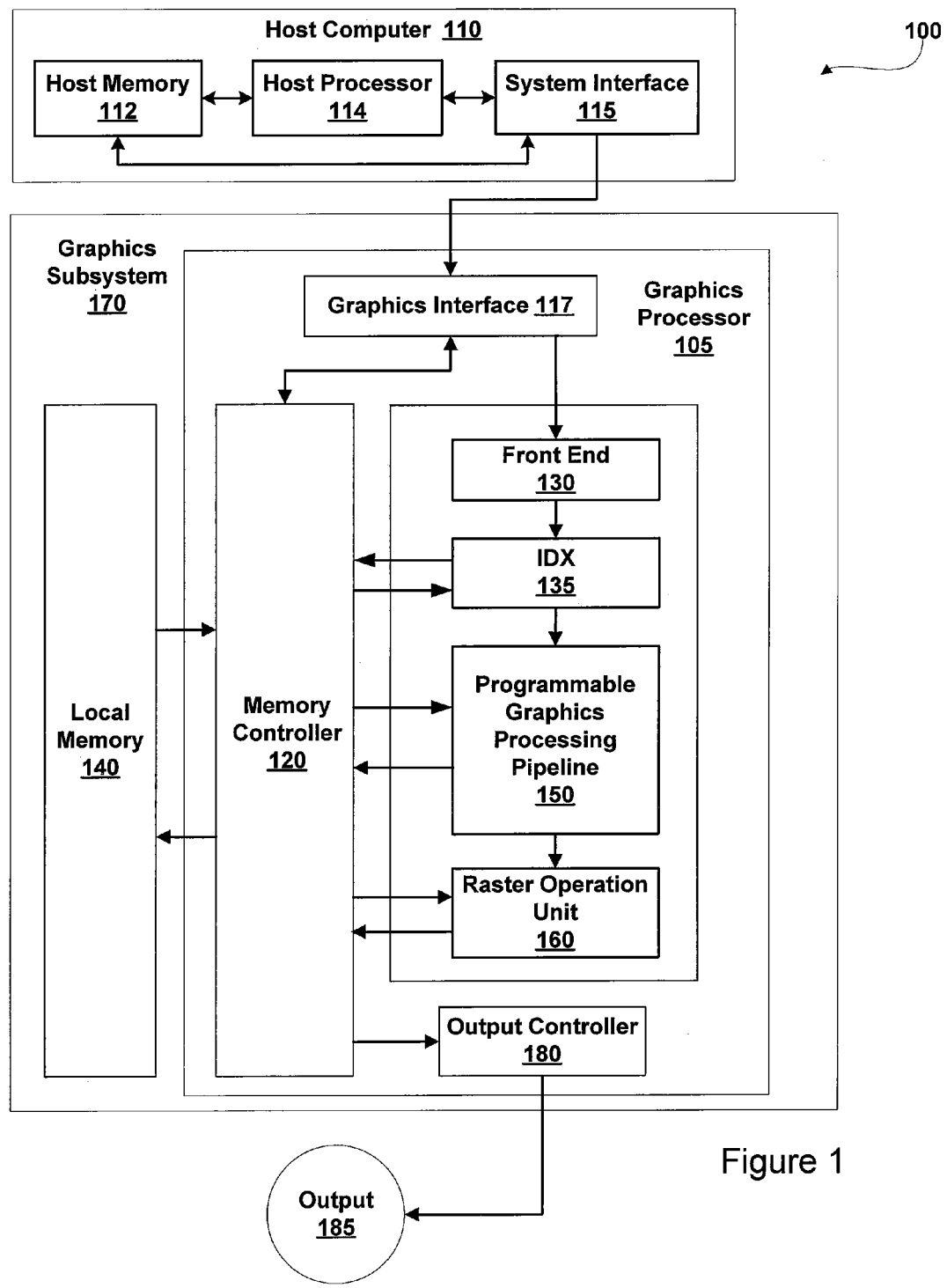
FIG. 1 is a block diagram of an exemplary embodiment of a respective computer system in accordance with one or more aspects of the present invention including a host computer and a graphics subsystem.

FIG. 1 is an illustration of a Computing System generally designated 100 and including a Host Computer 110 and a Graphics Subsystem 170. Computing System 100 may be a desktop computer, server, laptop computer, palm-sized computer, tablet computer, game console, portable wireless terminal such as a personal digital assistant (PDA) or cellular telephone, computer based simulator, or the like. Host Computer 110 includes Host Processor 114 that may include a system memory controller to interface directly to Host Memory 112 or may communicate with Host Memory 112 through a System Interface 115. System Interface 115 may be an I/O (input/output) interface or a bridge device including the system memory controller to interface directly to Host Memory 112. An example of System Interface 115 known in the art includes Intel® Northbridge.

Host Computer 110 communicates with Graphics Subsystem 170 via System Interface 115 and a Graphics Interface 117 within a Graphics Processor 105. Data received at Graphics Interface 117 can be passed to a Front End 130 or written to a Local Memory 140 through Memory Controller 120. Graphics Processor 105 uses graphics memory to store graphics data and program instructions, where graphics data is any data that is input to or output from components within the graphics processor. Graphics memory may include portions of Host Memory 112, Local Memory 140, register files coupled to the components within Graphics Processor 105, and the like.

Graphics Processor 105 includes, among other components, Front End 130 that receives commands from Host Computer 110 via Graphics Interface 117. Front End 130 interprets and formats the commands and outputs the formatted commands and data to an IDX (Index Processor) 135. Some of the formatted commands are used by Programmable Graphics Processing Pipeline 150 to initiate processing of data by providing the location of program instructions or graphics data stored in memory. IDX 135, Programmable Graphics Processing Pipeline 150 and a Raster Operation Unit 160 each include an interface to Memory Controller 120 through which program instructions and data can be read from memory, e.g., any combination of Local Memory 140 and Host Memory 112. When a portion of Host Memory 112 is used to store program instructions and data, the portion of Host Memory 112 can be uncached so as to increase performance of access by Graphics Processor 105.

IDX 135 optionally reads processed data, e.g., data written by Raster Operation Unit 160, from memory and outputs the data, processed data and formatted commands to Programmable Graphics Processing Pipeline 150. Programmable Graphics Processing Pipeline 150 and Raster Operation Unit 160 each contain one or more programmable processing units to perform a variety of specialized functions. Some of these functions are table lookup, scalar and vector addition, multiplication, division, coordinate-system mapping, calculation of vector normals, tessellation, calculation of derivatives, interpolation, and the like. Programmable Graphics Processing Pipeline 150 and Raster Operation Unit 160 are each optionally configured such that data processing operations are performed in multiple passes through those units or in multiple passes within Programmable Graphics Processing Pipeline 150. Raster Operation Unit 160 includes a write interface to Memory Controller 120 through which data can be written to memory.

In a typical implementation Programmable Graphics Processing Pipeline 150 performs geometry computations, rasterization, and fragment computations. Therefore, Programmable Graphics Processing Pipeline 150 is programmed to operate on surface, primitive, vertex, fragment, pixel, sample or any other data. For simplicity, the remainder of this description will use the term "samples" to refer to graphics data such as surfaces, primitives, vertices, pixels, fragments, or the like.

Samples output by Programmable Graphics Processing Pipeline 150 are passed to a Raster Operation Unit 160, which optionally performs near and far plane clipping and raster operations, such as stencil, z test, and the like, and saves the results or the samples output by Programmable Graphics Processing Pipeline 150 in Local Memory 140. When the data received by Graphics Subsystem 170 has been completely processed by Graphics Processor 105, an Output 185 of Graphics Subsystem 170 is provided using an Output Controller 180. Output Controller 180 is optionally configured to deliver data to a display device, network, electronic control system, other computing system such as Computing System 100, other Graphics Subsystem 170, or the like. Alternatively, data is output to a film recording device or written to a peripheral device, e.g., disk drive, tape, compact disk, or the like.

Figure 2:
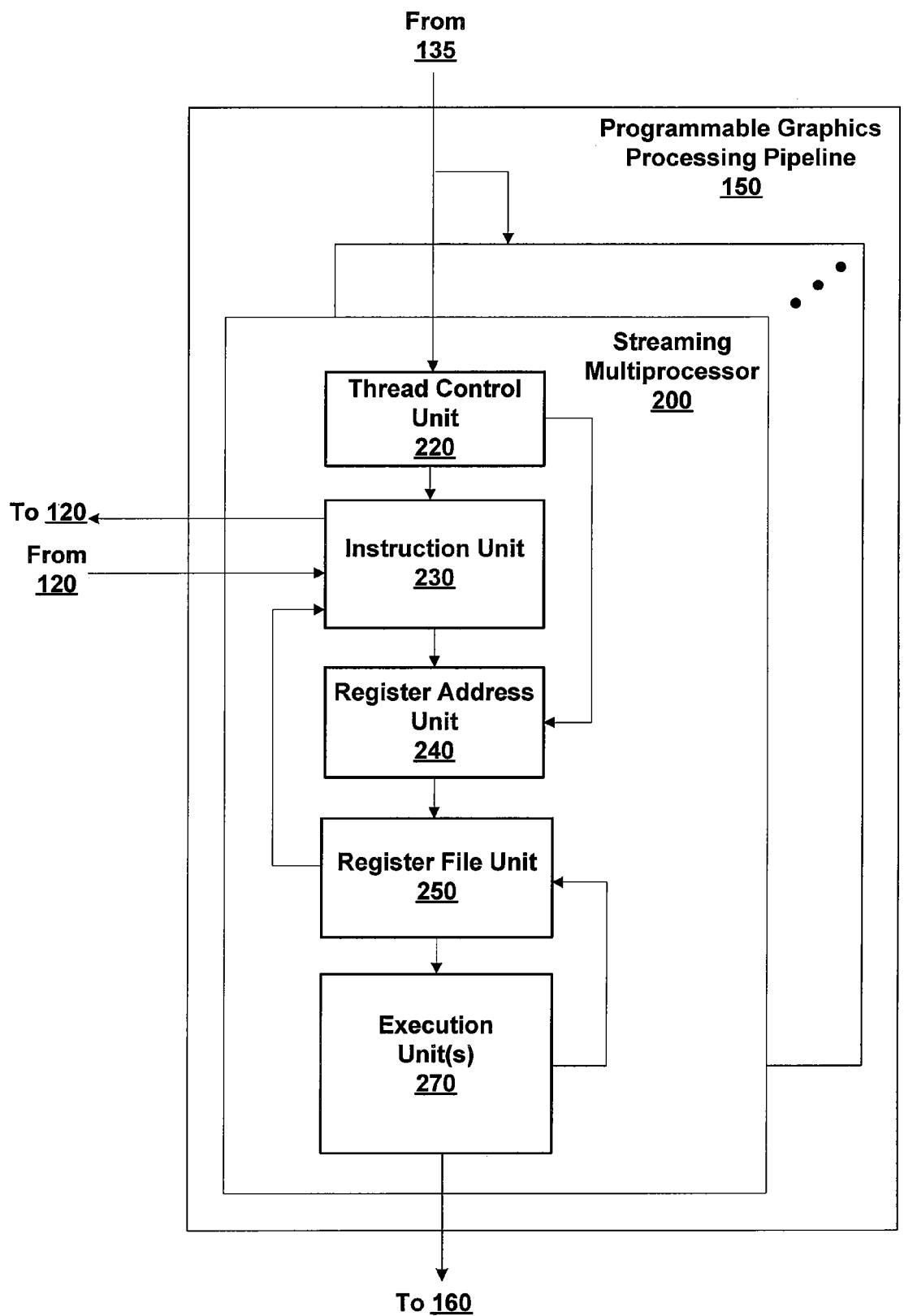
FIG. 2 is a block diagram of an exemplary embodiment of the Programmable Graphics Processing Pipeline of FIG. 1 in accordance with one or more aspects of the present invention.

FIG. 2 is an illustration of Programmable Graphics Processing Pipeline 150 of FIG. 1. At least one set of samples is output by IDX 135 and received by Programmable Graphics Processing Pipeline 150 and the at least one set of samples is processed according to at least one program, the at least one program including graphics program instructions. A program can process one or more sets of samples. Conversely, a set of samples can be processed by a sequence of one or more programs. Some embodiments of Programmable Graphics Processing Pipeline 150 include additional units configured to perform specific functions such as rasterization of primitive data to generate fragment data.

Samples, e.g., surfaces, primitives, processed data, or the like, are received by Programmable Graphics Processing Pipeline 150 from IDX 135. In alternative embodiments of the present invention one or more Steaming Multiprocessors 200 is included within a general purpose processor, such as Host Processor 114. Programmable Graphics Processing Pipeline 150 includes one or more Streaming Multiprocessors 200, as shown in FIG. 2. Each Streaming Multiprocessor 200 includes at least Execution Unit(s) 270, to be described further herein. The samples may be processed by any one of the Streaming Multiprocessors 200. In some embodiments of Streaming Multiprocessor 200, a read interface (not shown in FIG. 2) is used to read graphics data such as texture maps from Local Memory 140 or Host Memory 112 via Memory Controller 120. A sample is accepted by a Streaming Multiprocessor 200 when a processing thread within the Streaming Multiprocessor 200 is available, as described further herein.

A Thread Control Unit 220 within a Streaming Multiprocessor 200 receives samples and a pointer to a sequence of program instructions to be executed to process the samples. Thread Control Unit 320 assigns a thread to each sample to be processed. A thread includes a pointer to a program instruction (program counter), such as the first instruction within the program, thread state information, and storage resources for storing operands used and generated during processing of the sample. When a resource, e.g. storage resource for storing operands or thread state information, needed to process a thread is not available, the Streaming Multiprocessor 200 will not accept additional samples for processing. When the program instructions associated with a thread have completed execution, the storage resources, e.g., registers, allocated to store operands received and generated during execution of the thread become available for allocation to another thread, i.e., the storage resources are deallocated and the thread is flagged as available in Thread Control Unit 220.

Thread Control Unit 220 allocates storage resources needed for storing operands, and provides allocation details including register organization (thin, fat, or hybrid) starting register number, and the number of registers allocated, to a Register Address Unit 240. Thread Control Unit 220 outputs the pointer and the samples to an Instruction Unit 230. The number of pointers and samples that can be output each clock cycle from Thread Control Unit 220 to Instruction Unit 230 may vary between different embodiments of the present invention.

Instruction Unit 230 uses a dedicated read interface to read the program instructions from Local Memory 140 or Host Memory 112 via Memory Controller 120. In an alternate embodiment of the present invention, a single Instruction Unit 230 is shared between Streaming Multiprocessors 200. In some embodiments of the present invention, Instruction Unit 230 includes an instruction cache.

Instruction Unit 230 executes instructions which do not process data, such as jump, call/return, or branch instructions. Instruction Unit 230 schedules the execution of the program instructions. The instructions can be selected from different threads to allow any thread that is active, i.e., assigned to a sample, to proceed. In some embodiments of the present invention, Instruction Unit 230 schedules the execution of the program instructions without additional information specifying the specific locations of the registers within a Register File Unit 250 that are allocated to the threads, e.g., the bank that the registers is located in.

Instruction Unit 230 may be configured to use fixed or programmable priorities when scheduling program instructions for threads. For example, threads allocated to process vertex program instructions may always get higher priority than threads allocated to process fragment program instructions. In another example, threads requiring a large number of registers for storing operands may have higher priority than threads requiring fewer registers for storing operands. In some embodiments of the present invention, Instruction Unit 230 receives information from a Register File Unit 250 indicating utilization of registers for particular threads and Instruction Unit 230 adjusts the priority of the particular threads accordingly to reduce or increase the utilization of registers in Register File Unit 250.

In other embodiments of the present invention, Instruction Unit 230 schedules the execution of the program instructions using additional information specifying the specific locations of the registers within a Register File Unit 250. For example, the program instructions are pre-sorted into groups based on the bank or banks within Register File Unit 250 where one or more of the operands for the instruction are stored. Instruction Unit 230 selects one program instruction from each group in a round-robin fashion, outputting one or more program instructions to Register Address Unit 240 each clock cycle.

Instruction Unit 230 outputs the program instructions and samples to Register Address Unit 240. Register Address Unit 240 accesses registers within Register File Unit 250 that store operands specified by each thread, as described in conjunction with FIG. 3 and FIG. 5. Register Address Unit 240 outputs requests for each program instruction. Examples of requests include a read request for a specific operand or a write request for a specific operand, where the write request is service once the instruction has completed execution. In one embodiment of the present invention, Register Address Unit 240 outputs requests for a single instruction during each clock cycle. For example, for a load instruction (LD), one address is read and one write request is output to write an operand to a register. Similarly, for a multiply-accumulate (MAD) instruction, 3 read requests (one for each source operand) and 1 write request (for the destination operand) are output.

Register Address Unit 240 outputs the requests and a corresponding program instruction, e.g., MAD, to Register File Unit 250. Register File Unit 250 processes the requests, reading operands to and writing operands from registers within Register File Unit 250. Register File Unit 250 schedules processing of the requests to avoid write back conflicts and cycle based conflicts. In some embodiments of the present invention, Instruction Unit 230 uses a scoreboard unit to track the status of operand writes to registers to determine when an operand may be read from a register.

When read requests are processed to acquire operands needed to process a program instruction, Register File Unit 250 determines when all of the operands have been acquired and then outputs the program instruction and operands to Execution Unit(s) 270 for processing. Execution Unit(s) 270 returns processed operands to Register File Unit 250 to be written to destination operands as specified by program instructions. Execution Pipeline 270 is configured by the program instructions to perform operations such as tessellation, perspective correction, interpolation, shading, blending, and the like. Processed samples are output from each Execution Pipeline 270 to Raster Operation Unit 160. In some embodiments of the present invention, additional Execution Pipelines 270 to are coupled to Register File Unit 250 and Raster Operation Unit 160.

Figure 3:
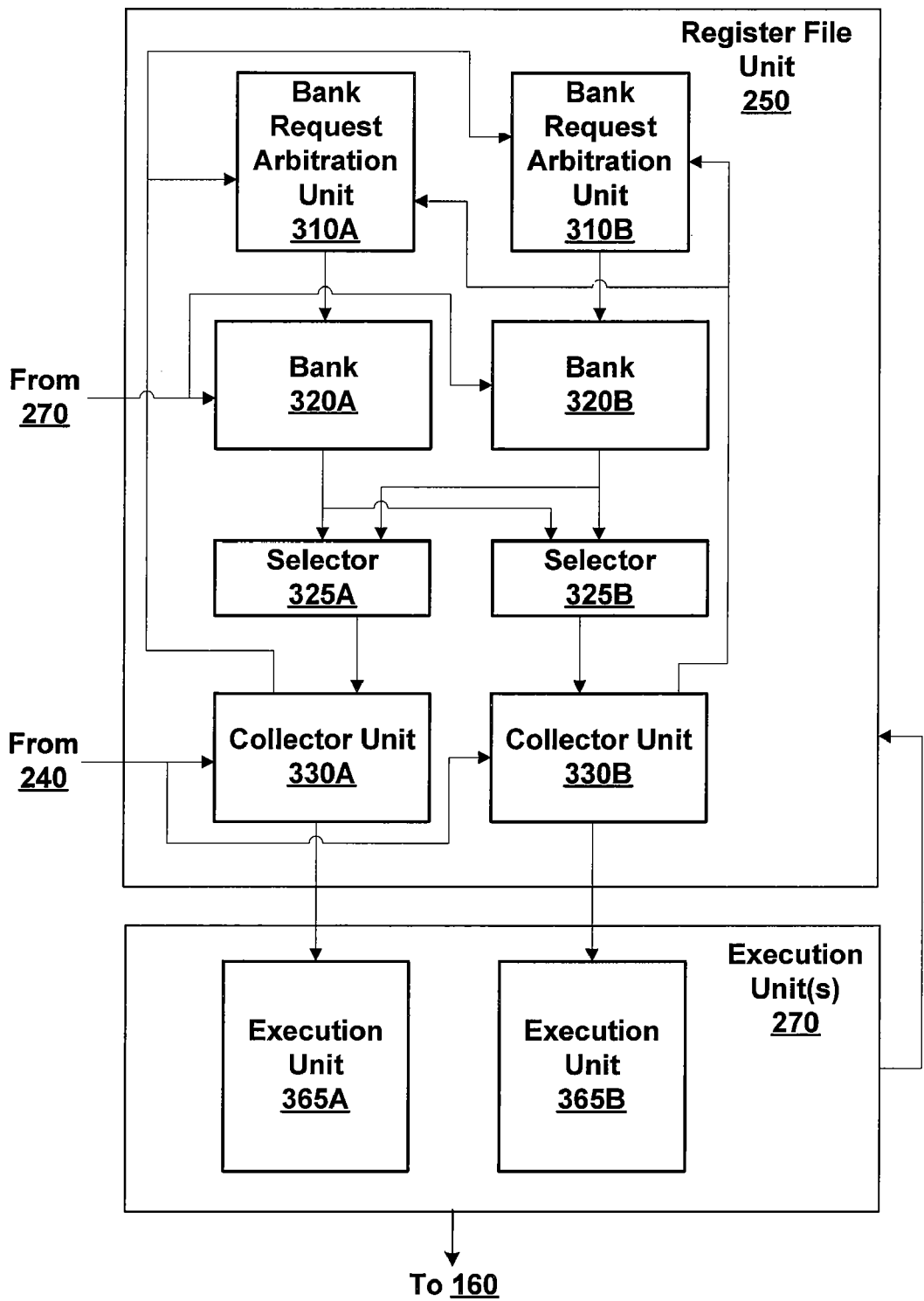
FIG. 3 is a block diagram of an exemplary embodiment of the Register File Unit of FIG. 2 in accordance with one or more aspects of the present invention.

FIG. 3 is a block diagram of an exemplary embodiment of Register File Unit 250 shown in FIG. 2 in accordance with one or more aspects of the present invention. In alternate embodiments of the present invention Register File Unit 250 is used within a general purpose processor, such as Host Processor 114. Register File Unit 250 includes two or more memory banks, Banks 320A and 320B that are configured to simulate a single multiported memory. Each Bank 320A and 320B includes several locations which function as registers that are configured to store operands. Each Collector Unit 330A and 320B receives the requests and the corresponding program instruction from Register Address Unit 240 and determines if the program instruction is an instruction for execution by the particular Execution Unit 365A or 365B coupled to the Collector Units 330A and 330B. If the program instruction is an instruction for execution by the particular Execution Unit 365A or 365B coupled to the Collector Unit 330A or 330B, the Collector Unit 330A or 330B accepts the program instruction and requests for processing. In some embodiments of the present invention, each Execution Unit 365A and 365B is identical and a priority scheme is used to determine which Execution Unit 365A or 365B will execute the program instruction. Alternative embodiments of the present invention assign the instruction to the least-loaded Execution Unit 365A or 365B. In some embodiments of the present invention two or more Collector Units 330A and 330B are coupled to a single Execution Units 365A and 365B and a priority scheme is used to choose which of the two or more Collector Units outputs operands to the single Execution Unit 365A or 365B for processing.

Each Collector Unit 330A and 330B outputs requests for accepted program instructions to any Bank Request Arbitration Unit 310A or 310B. Each Bank Request Arbitration Unit 310A and 310B determines if the request requires a read of a register in the particular Bank 320A or 320B coupled to the Bank Request Arbitration Unit 310A and 310B. Some possible register allocations are described in conjunction with FIGS. 4A, 4B, 4C, 4D, 4E, and 4F. Each request is output by one Bank Request Arbitration Unit 310A or 310B to the Bank 320A or 320B where the register assigned to the operand specified in the request is located. Accepted program instructions remain in Collector Units 330A and 330B designated to gather the operands. Each Bank Request Arbitration Unit 310A or 310B also arbitrates between the different Collector Units 330A and 330B and outputs one request per clock cycle to the Bank 320A or 320B coupled to the Bank Request Arbitration Unit 310A or 310B.

Each Bank 320A or 320B includes a read request port for receiving requests from a Bank Request Arbitration Unit 310A or 310B. Each Bank 320A and 320B also includes a write request port for receiving write requests from Execution Unit(s) 270 to write processed data to a destination register assigned to an operand specified by a program instruction. Therefore, 2 banks of lower port count memories (1 write port and 1 read port) are used to simulate a multiport memory with 2 write ports and 2 read ports. In some embodiments of the present invention, additional request ports are used. In other embodiments of the present invention, the read request port is combined with the write request port, accessing a single-port memory. During a clock cycle, each Bank 320A and 320B may output an operand specified by read request to a corresponding Collector Unit 330A or 330B via a Selector 325A or 325B. Therefore, when a program instruction specifies 3 operands for source data, at least 3 clock cycles are needed to gather the operands when they reside in the same Bank 320A or 320B. Each Collector Unit 330A and 320B may also gather source data, such as constants and intermediate data that are stored in registers outside of Banks 320A and 320B (not shown). Selectors 325A and 325B receive source data not stored in Banks 320A or 320Bs from inputs (not shown). When all of the operands are gathered by a Collector Units 330A and 330B, the program instruction is ready to be dispatched. In some embodiments of the present invention, additional Bank Request Arbitration Units 310A and 310B, Banks 320A and 320B, Selectors 325A and 325B, and Collector Units 330A and 330B are included to increase the number of operands that are read during a clock cycle. In one embodiment of the present invention, Selectors 325A and 325B are omitted and each Bank 320A and 320B is coupled directly to a Collector Unit 330A or 330B.

When all of the operands for a program instruction have been gathered by a Collector Unit 330A or 330B, the program instruction and operands are output by the Collector Units 330A and 330B to the Execution Units 365A and 365B coupled to the Collector Units 330A and 330B for processing. When execution of the program instruction is completed, the Execution Unit 365A or 365B outputs a write request to one of Banks 320A or 320B if a destination operand was specified by the program instruction. Execution Unit 270(s) may also output processed operands to Raster Operation Unit 160. Execution of different instructions may incur different latencies as they are processed by Execution Units 365A and 365B.

Figure 4A:
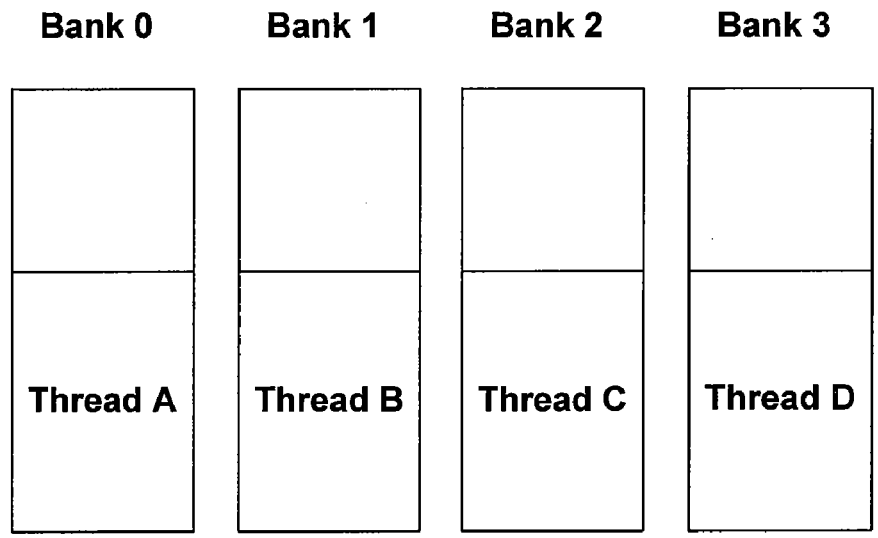
FIG. 4A is an exemplary embodiment of an allocation of registers for processing threads in accordance with one or more aspects of the present invention.

In one embodiment of the present invention, registers for storing operands for processing a thread may be allocated within a single bank, such as a Bank 320A or 320B. Such an allocation is referred to as a "thin" allocation type. FIG. 4A is an exemplary embodiment of a thin allocation of registers for processing threads in 4 banks accordance with one or more aspects of the present invention. In FIG. 4A registers to store operands for processing Thread A are allocated in Bank 0, registers to store operands for processing Thread B are allocated in Bank 1, registers to store operands for processing Thread C are allocated in Bank 2, and registers to store operands for processing Thread D are allocated in Bank 3. Registers to store operands for processing additional threads may be allocated in Bank 0, Bank 1, Bank 2, and/or Bank 3. In alternative embodiments of the present invention, fewer or more banks are used.

Figure 4B:
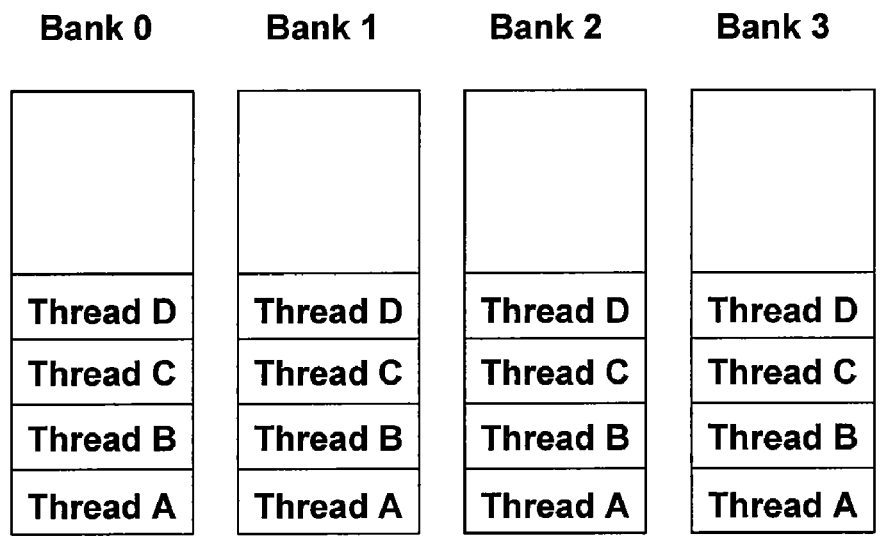
FIGS. 4B, 4C, and 4D are other exemplary embodiments of allocations of registers for processing threads in accordance with one or more aspects of the present invention.

In another embodiment of the present invention, registers for storing operands for processing a thread may be allocated within each of the 4 banks, where each bank may be a Bank 320. Such an allocation is referred to as a "fat" allocation type. FIG. 4B is an exemplary embodiment of a fat allocation of registers for processing threads in 4 banks accordance with one or more aspects of the present invention. In FIG. 4B registers to store operands for processing Thread A are allocated in Bank 0, Bank 1, Bank 2, and Bank 3. Registers to store operands for processing Threads B, C, and D are also allocated in Bank 0, Bank 1, Bank 2, and Bank 3. In alternative embodiments of the present invention, fewer or more banks are used.

In some embodiments of the present invention, registers for processing threads are allocated in "bank count" units representing a specific number of registers in either a fat or thin allocation type. In a specific embodiment of the present invention, registers for a single bank are tracked (e.g. Bank 0) and the other banks are allocated identically with that bank.

Figure 4C:
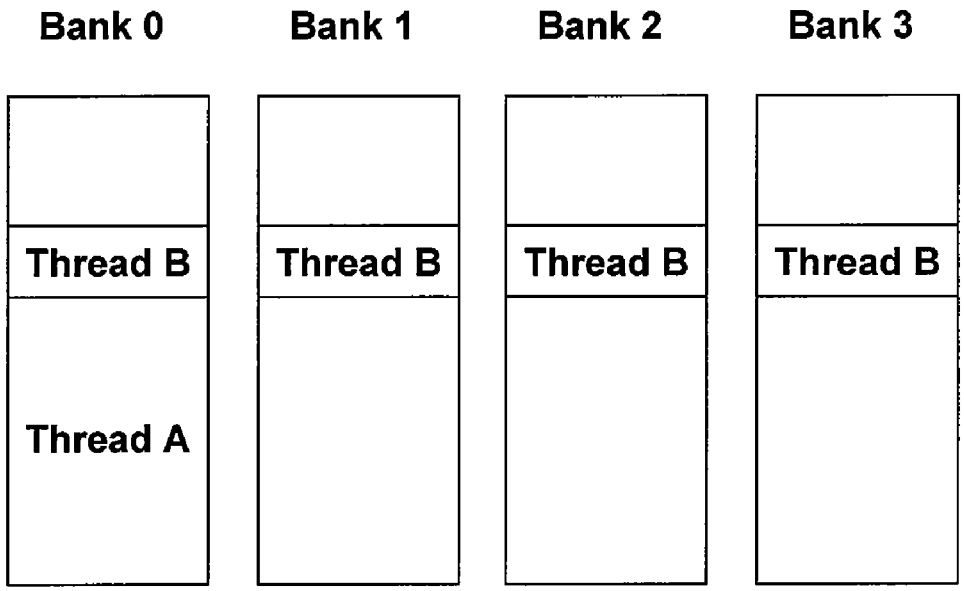
Figure 4D:
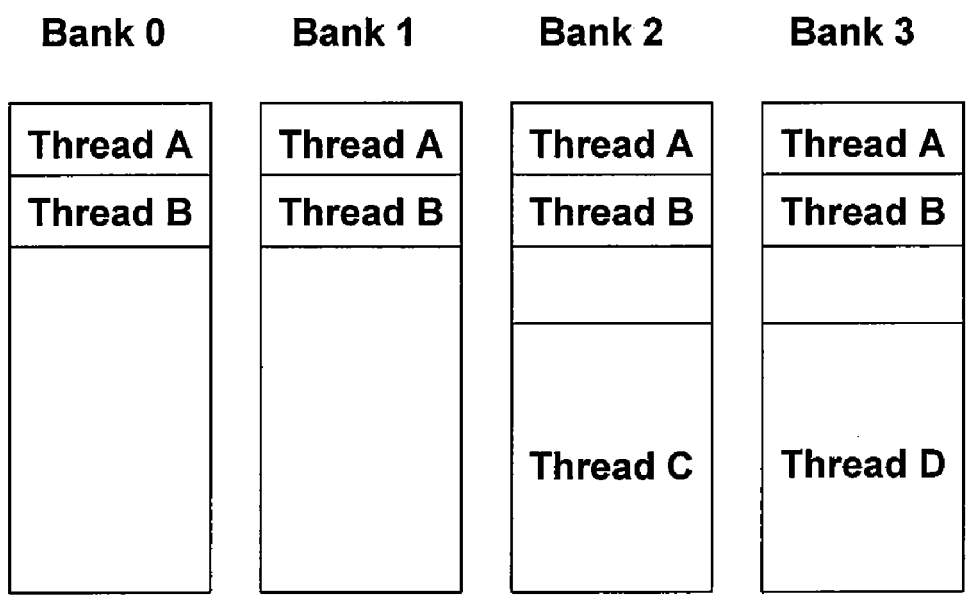

Registers to store operands for processing additional threads may be allocated in Bank 0, Bank 1, Bank 2, and/or Bank 3 using either a fat or a thin allocation. However, mixing fat and thin allocation types may result in poor utilization of the registers available for allocation as shown in FIG. 4C. For example, when a first thread, such as Thread A uses a thin allocation in Bank 0 and a second thread, such as Thread B uses a fat allocation in each of the 4 banks, a third thread using a thin allocation may be delayed until execution of the first thread is completed. Alternatively, in some embodiments of the present invention, fat allocation types may be made from the top of each bank and thin allocation types may be made from the bottom of each bank, as shown in FIG. 4D. Threads A and B use a fat allocation and Threads C and D use a thin allocation. This "splitting" of the allocations permits packing of same allocation types to more efficiently utilize the registers available for allocation.

When a fat allocation is used for threads, the location assigned to each operand may simply proceed in a sequential order. FIG. 4E is an exemplary embodiment of an assignment of registers for threads in a sequential order in accordance with one or more aspects of the present invention. For example, a register allocated to thread A assigned to store Operand 400A is located in Bank 0, as is a register allocated to thread B assigned to store Operand 400B. If thread A and thread B are executing the same program instructions it is possible that a bank conflict will occur when thread A and thread B process a program instruction that reads Operand 400A for thread A and Operand 400B for thread B. The bank conflict may be avoided if Operand 400B and Operand 400A are not stored in the same bank.

A phase value may be used during the register assignment process so that threads processing the same program instruction will not have their corresponding operands specified by the program instruction assigned to registers that are in the same bank. FIG. 4F is an exemplary embodiment of an assignment of registers for threads using a phase value in accordance with one or more aspects of the present invention. For example, a register allocated to thread A assigned to store Operand 410A is located in Bank 0, and a register allocated to thread B assigned to store Operand 410B is located in Bank 1. If thread A and thread B are executing the same program instructions a bank conflict does not occur when thread A and thread B process a program instruction that reads Operand 410A for thread A and Operand 410B for thread B. In an this embodiment of the present invention, registers are remapped to avoid a situation where one bank is accessed far more often than the other banks. For example, if the compiler schedules a program such that an operand R0 is used more often than an operand R1, and R0 for each thread is stored in the same bank, then that bank will receive excessive traffic. Accordingly, operands R0 for each thread are distributed in different banks. For example, with 4 Banks, the lower two bits of an assigned register number may be exclusive ORed (XOR) with a unique phase value corresponding to the thread that the register is allocated to. An alternative method of the present invention is to add the phase value to the assigned register number, then modulo the number of Banks.

When a fat allocation is used for registers, it is possible that two or more operands needed to process a program instruction will be assigned to registers in two or more different banks. For example if a program instruction for thread A specifies Operands 414A and 415A, read requests will be queued in two different Request Queues 310, one coupled to Bank 0 and the other coupled to Bank 1. Likewise, Operand 414A will be output to the Collector Unit 330 coupled to Bank 0 and Operand 415A will be output to the Collector Unit 330 coupled to Bank 1. Since a single Collector Unit 330 gathers the operands for each program instruction, a mechanism is used to permit the transfer of operands between the different banks and Collector Units 330.

Figure 5:
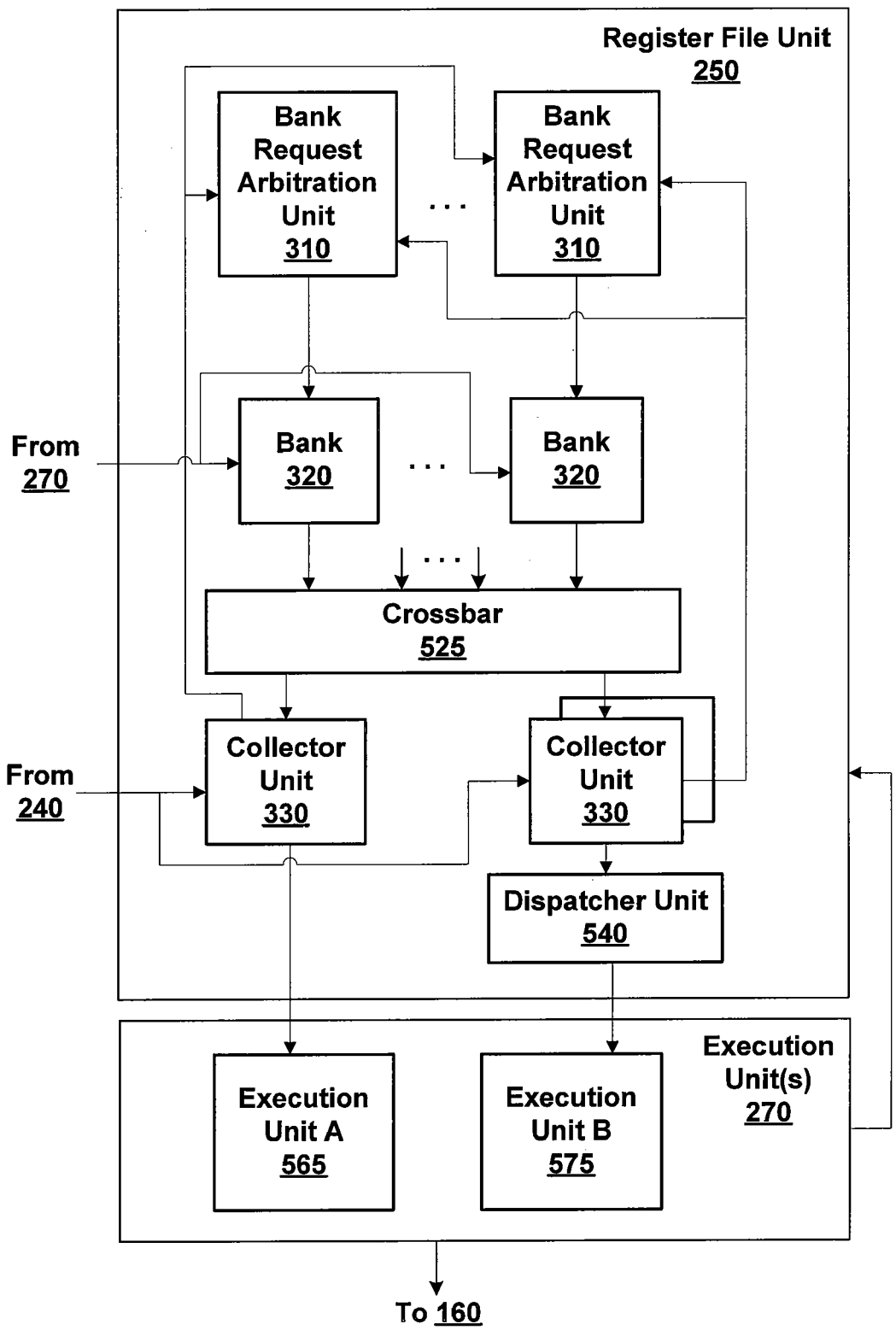
FIG. 5 is a block diagram of another exemplary embodiment of the Register File Unit of FIG. 2 in accordance with one or more aspects of the present invention.

FIG. 5 is a block diagram of another exemplary embodiment of the Register File Unit of FIG. 2 including a Crossbar 525 and a plurality of Banks 320, each Bank 320 coupled to a Bank Request Arbitration Unit 310, in accordance with one or more aspects of the present invention. Crossbar 525 is configured such that an operand output from any Bank 320 may be routed to the input of any Collector Unit 330. Therefore, all of the operands specified by a program instruction may be collected by a single Collector Unit 330. As described in conjunction with FIG. 3, each Collector Unit 330 gathers operands specified by a program instruction from any Bank 320. When Crossbar 525 is used, thread scheduling and register allocation (fat or thin) may proceed more efficiently than when each Bank 320 is connected directly to one Collector Unit 330.

A Dispatcher Unit 540 is coupled between a set of Collector Units 330 and an Execution Unit B 575. Dispatcher Unit 540 may receive program instructions and corresponding operands, e.g., inputs, from each Collector Unit 330 within the set, therefore Dispatcher Unit 540 arbitrates between the Collector Units 330 within the set. In some embodiments of the present invention, Dispatcher Unit 540 arbitrates in a round-robin fashion. In other embodiments of the present invention, each Collector Unit 330 within the set has a corresponding priority and Dispatcher Unit 540 accepts inputs from each Collector Unit 330 based on the priority. For example, one Collector Unit 330 may have higher priority than the other Collector Units 330 and Dispatcher Unit 540 will always accept inputs from the one Collector Unit 330 if a program instruction and operands are available.

A single Collector Unit 330 is directly coupled to an Execution Unit A 565. Execution Unit A 565 may be configured to execution specific instructions that Execution Unit B 575 is not configured to execute. Therefore, single Collector Unit 330 accepts program instructions (and requests) for execution by Execution Unit A 565 and set of Collector Units 330 accepts program instructions (and requests) for execution by Execution Unit B 575.

Figure 6A:
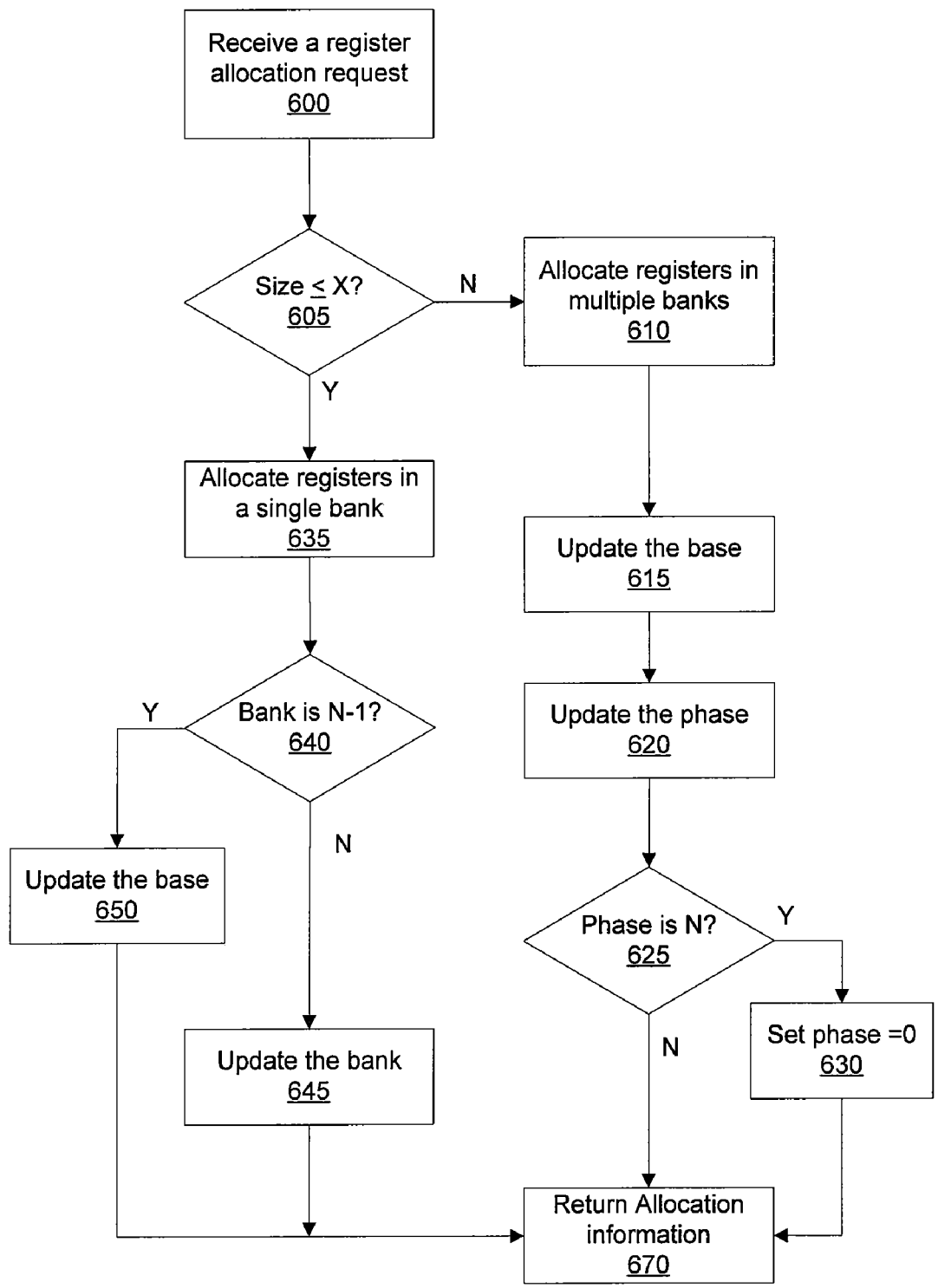
FIG. 6A illustrates an embodiment of a method of allocating registers for processing a thread in accordance with one or more aspects of the present invention.

FIG. 6A illustrates an embodiment of a method of allocating registers for processing a thread in accordance with one or more aspects of the present invention. In step 600 a register allocation request for a thread is received by Register Address Unit 240 from Thread Control Unit 220. In step 605 Register Address Unit 240 determines if the size, i.e., number of registers, needed to process the thread is less than or equal to a fixed or programmable value, X. If, Register Address Unit 240 determines the size is greater than X, then in step 610 Register Address Unit 240 allocates registers for storing operands in multiple Banks 320, i.e. a fat allocation. In step 615, Register Address Unit 240 updates a base pointer. The base pointer indicates the first location available for allocation within Banks 320.

In step 620 Register Address Unit 240 updates a phase value, so that registers assigned to operands allocated for a subsequent thread will be skewed relative to the registers allocated in step 610 In a specific embodiment of the present invention, the phase value is updated by being assigned a value based on the thread identifier, such that the phase is equal to the thread id modulo (number of banks in register file), though in other embodiments of the present invention, other methods may be used to update the phase. In step 625 Register Address Unit 240 determines if the phase value is equal to N, where N is the number of Banks 320. If, in step 625, Register Address Unit 240 determines that the phase value is equal to N, in step 630, Register Address Unit 240 sets the phase value to 0 and proceeds to step 670. If, in step 625, Register Address Unit 240 determines that the phase value is not equal to N, Register Address Unit 240 proceeds to step 670 and outputs the allocation information to Request Distribution Unit 300 within Register File Unit 250.

If, in step 605 Register Address Unit 240 determines the size is less than or equal to X, then in step 635 Register Address Unit 240 allocates registers for storing operands in a single Bank 320, i.e. a thin allocation, specified by the bank indicator. In step 640, Register Address Unit 240 determines if the Bank 320 available for a thin allocation is N-1. If, in step 640, Register Address Unit 240 determines the Bank 320 available for allocation is bank N-1, as specified by a bank indicator, then in step 650 Register Address Unit 240 updates the base to indicate the first location available for allocation and proceeds to step 670, and the bank is set to bank 0. If, in step 640, Register Address Unit 240 determines the Bank 320 available for allocation is not bank N-1, then in step 645 Register Address Unit 240 updates the bank indicator by incrementing the bank indicator by 1 and proceeds to step 670 As previously described, in step 670 Register Address Unit 240 outputs the allocation information to Request Distribution Unit 300 within Register File Unit 250.

Figure 6B:
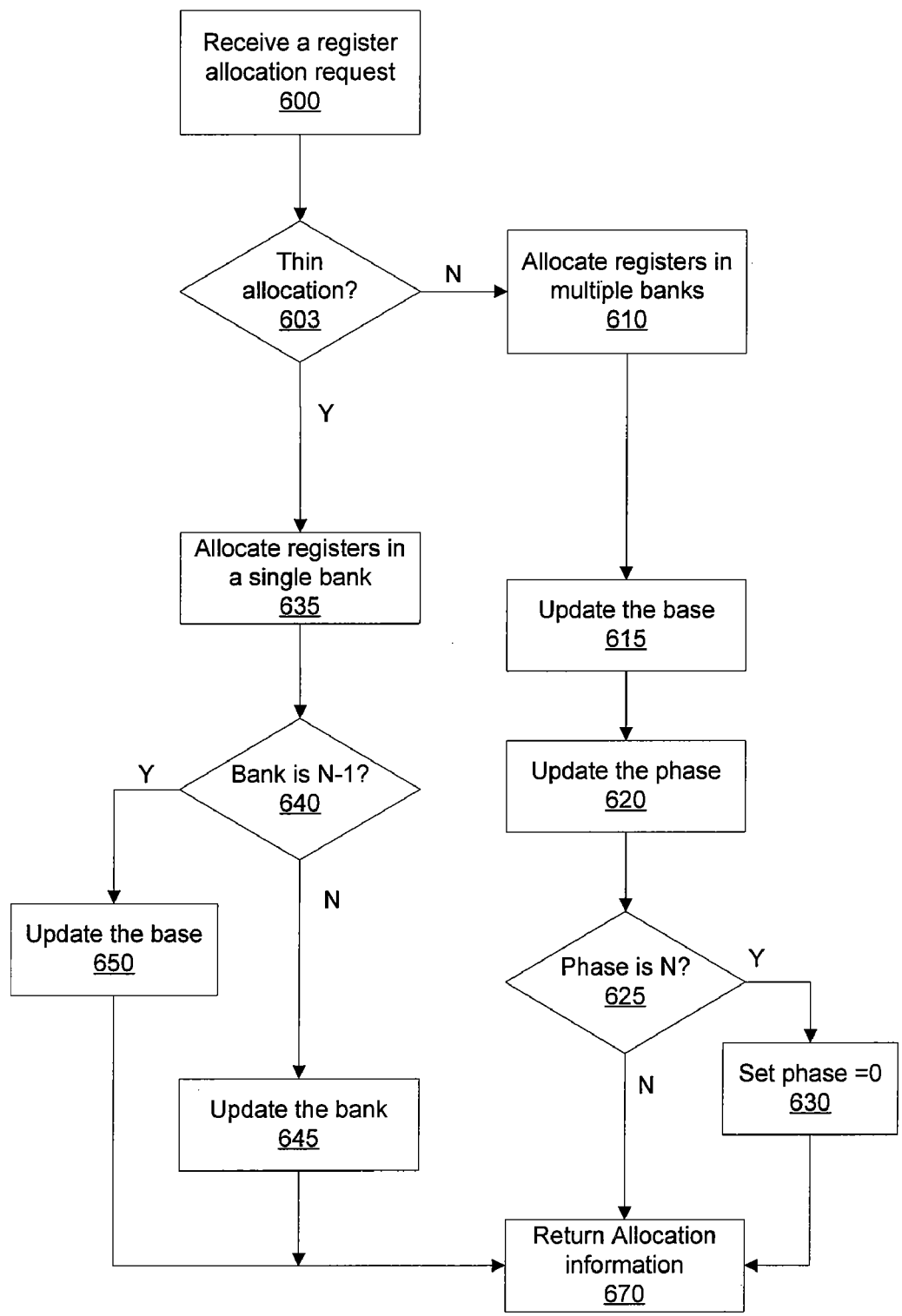
FIG. 6B illustrates an embodiment of another method of allocating registers for processing a thread in accordance with one or more aspects of the present invention.

FIG. 6B illustrates an embodiment of another method of allocating registers for processing a thread in accordance with one or more aspects of the present invention. In step 600 Register Address Unit 240 receives a register allocation request, including an allocation type of fat or thin. In some embodiments of the present invention, the allocation type is determined when the program instructions are compiled and is provided to Register Address Unit 240 by a driver. In step 603 Register Address Unit 240 determines if the specified allocation type is thin, and, if so, proceeds to steps 610, 615, 620, 625, 630, and 670, as previously described in conjunction with FIG. 6A. If, in step 603 Register Address Unit 240 determines that the specified allocation type is not thin, then Register Address Unit 240 proceeds to steps 635, 640, 645, 650, and 670, as previously described in conjunction with FIG. 6A.

Figure 6C:
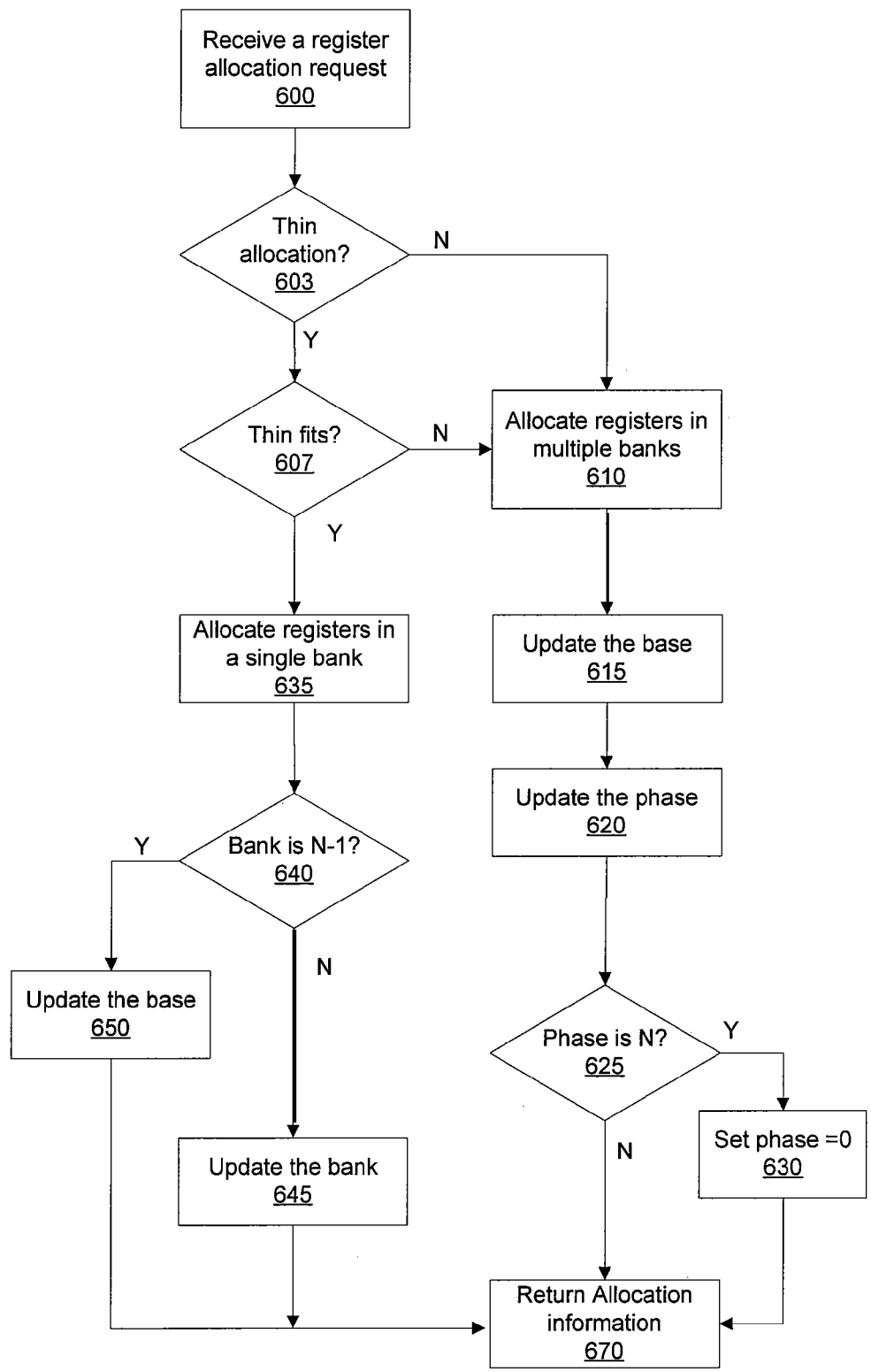
FIG. 6C illustrates an embodiment of another method of allocating registers for processing a thread in accordance with one or more aspects of the present invention.

FIG. 6C illustrates an embodiment of another method of allocating registers for processing a thread in accordance with one or more aspects of the present invention. In step 600 Register Address Unit 240 receives a register allocation request, including an allocation type of fat or thin. In step 603 Register Address Unit 240 determines if the specified allocation type is thin, and, if so, in step 607 Register Address Unit 240 determines if the thin allocation will fit, i.e., if the number of registers needed are available, within the Bank 320 specified by the bank indicator. If, in step 607 Register Address Unit 240 determines that the thin allocation will fit within the Bank 320, then Register Address Unit 240 proceeds to steps 635, 640, 645, 650, and 670, as previously described in conjunction with FIG. 6A.

If, in step 603 Register Address Unit 240 determines the specified allocation type is not thin, then Register Address Unit 240 proceeds to steps 610, 615, 620, 625, 630, and 670, as previously described in conjunction with FIG. 6A. If, in step 607 Register Address Unit 240 determines that the thin allocation will not fit within the Bank 230, then Register Address Unit 240 also proceeds to steps 610, 615, 620, 625, 630, and 670, as previously described in conjunction with FIG. 6A.

Therefore, persons skilled in the art will appreciate that any system configured to perform the method steps of FIGS. 6A, 6B, 6C, or their equivalents, is within the scope of the present invention. Furthermore, persons skilled in the art will appreciate that the method steps of FIGS. 6A, 6B, 6C, may be extended to support a register file unit including any number of banks to simulate a multiported memory An exemplary embodiment of the present invention provides an execution unit that is capable of processing three operands per instruction. Accordingly, each collector in this embodiment is capable of collecting three operands per instruction. To simplify routing and save die area, each of these collectors can collect one operand in each clock cycle. A block diagram illustrating this is shown in FIG. 7.

Figure 7:
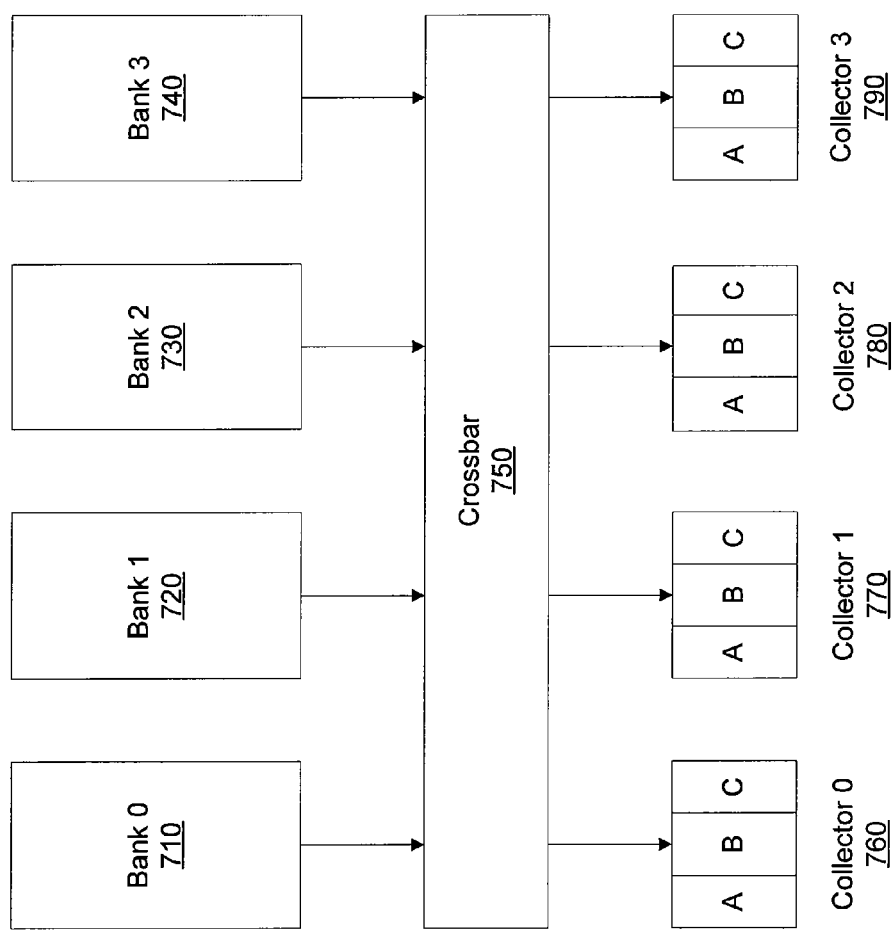
FIG. 7 is a block diagram of a portion of a graphics processor where a number of banks provide operands to a number of collectors via a crossbar.

FIG. 7 is a block diagram of a portion of a graphics processor where a number of banks provide operands to a number of collectors via a crossbar. In this embodiment of the present invention, there are four memory banks, bank 0 710, bank 1 720, bank 2 730, and bank 3 740. These banks may be tightly packed registers. That is, they may be registers that are arranged on an integrated circuit specifically for high density. Alternately, they may be another appropriate memory or storage structures. This figure also includes four collectors, collector 0 760, collector 1 770, collector 2 780, and collector 3 790. Each collector includes three storage locations, labeled here as A, B, and C. The banks provide operands to the collectors via the crossbar 750. In other embodiments of the present invention, other numbers of banks and other numbers of collectors may be employed, and a number of banks may be different than the number of collectors. Also in a specific embodiment of the present invention, each bank is a single-port memory. More specifically, it is a "pseudo dual-port memory." That is, it is a single-port memory that operates faster than the normal clock rate, such that both a read and a write can be performed in the one normal clock cycle. Accordingly, this type of memory behaves much like a dual-port memory, despite having just a single set of address decoders.

To reduce the amount of routing lines from the crossbar 752 the individual collectors 760-790, only one bus is provided from the crossbar 750 to each of the collectors. This saves die area and reduces overall device costs. Also, each bus is capable of conveying one operand in each clock cycle. Accordingly, each collector can collect one operand for one thread each clock cycle.

In other embodiments of the present invention, multiple buses are provided to each collector such that multiple operands can be received by a collector each clock cycle. This is particularly useful when fat allocation is used. Again, each bank is single ported, and operands are distributed in each bank when fat allocation is used. Accordingly, a collector having these multiple buses can collect multiple operands in one clock cycle. Specifically, this collector can collect as many operands as there are banks, again when fat allocation is used. When thin allocation is used, each thread stores operands in only one bank. Accordingly, a collector can collect only one operand per clock cycle when thin allocation is used, even if the collector is provided with these multiple buses. In these various embodiments of the present invention, if the same operand is repeated in an instruction, more operands can be collected each clock cycle.

Being able to collect only one operand during each clock cycle places timing constraints on the ability of the collectors to collect needed operands. This is particularly true when fat allocation is used. The FIG. 8 is a diagram illustrating the timing used to read operands from banks using a thin register allocation.

Figure 8:
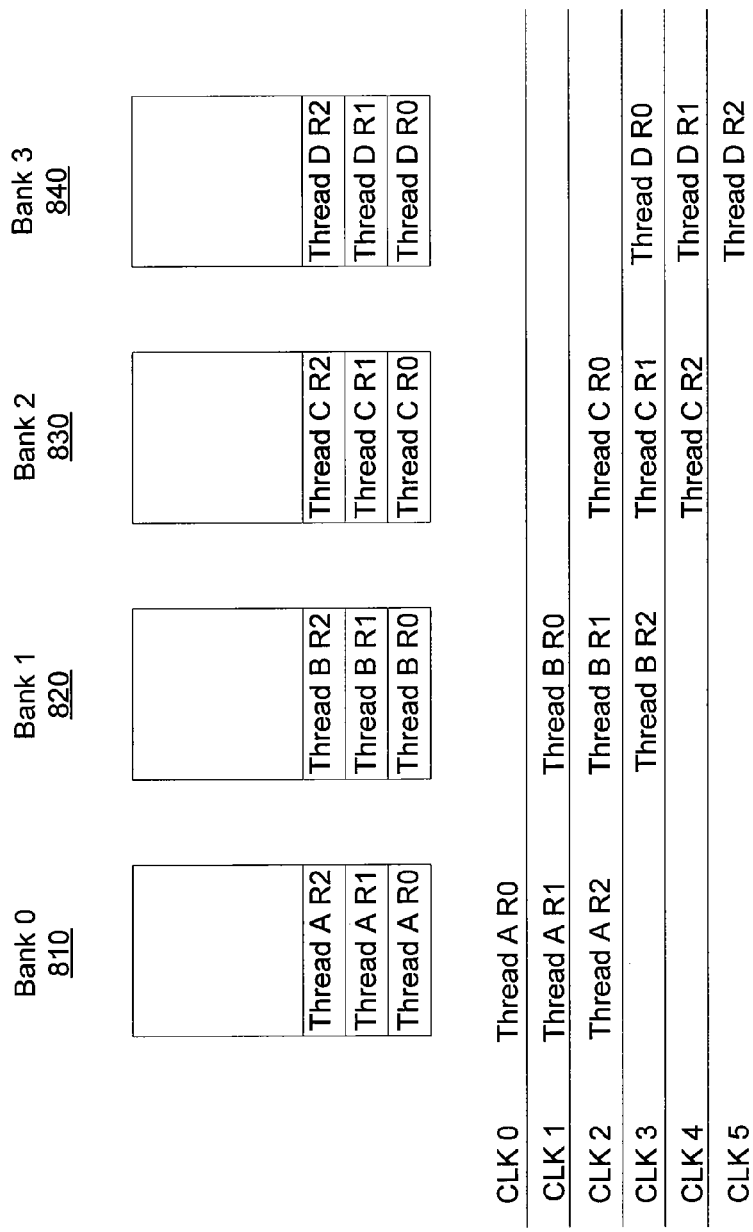
FIG. 8 is a timing diagram illustrating the transfer of operands according to an embodiment of the present invention.

FIG. 8 is a timing diagram illustrating the transfer of operands according to an embodiment of the present invention. In various embodiments of the present invention, this diagram shows the transfer of operands from memory banks to a crossbar, while in others this shows transfers from the crossbar to the collectors.

In this specific example, operands for four threads are stored in a thin format in four banks, bank 0 810, bank 1 820, bank 2 830, and bank 3 840. These operands are transferred during clock cycles CLK 0 through CLK 5.

Specifically, an instruction (not shown) to process thread A is initially received. The contents of register R0 for thread A are accordingly transferred during clock cycle CLK 0. Subsequently, an instruction (not shown) to process thread B is received. Accordingly, during the next clock cycle, CLK 1, the contents of register R0 for thread B are transferred. During the same clock cycle, the contents of register R1 for thread A are transferred. Similarly, operands for threads C and D are transferred on subsequent clock cycles. In this way, no more than one operand for each thread is transferred, and thus received by the appropriate collector, each clock cycle. When all three operands have been received, the corresponding instruction and operands may be passed to the execution units for execution.

More severe timing constraints occur when operands are store using a fat register allocation. This is because since operands for a given thread are stored in different banks, it is desirable to read out several operands for a thread at once, that is, one operand per bank. However, while this is possible in some embodiments of the present invention, in this specific embodiment, only one operand for a thread can be received by a collector each clock cycle. Accordingly, on occasion some reads are delayed, thus increasing register file latency. An example is shown in the FIG. 9.

Figure 9:
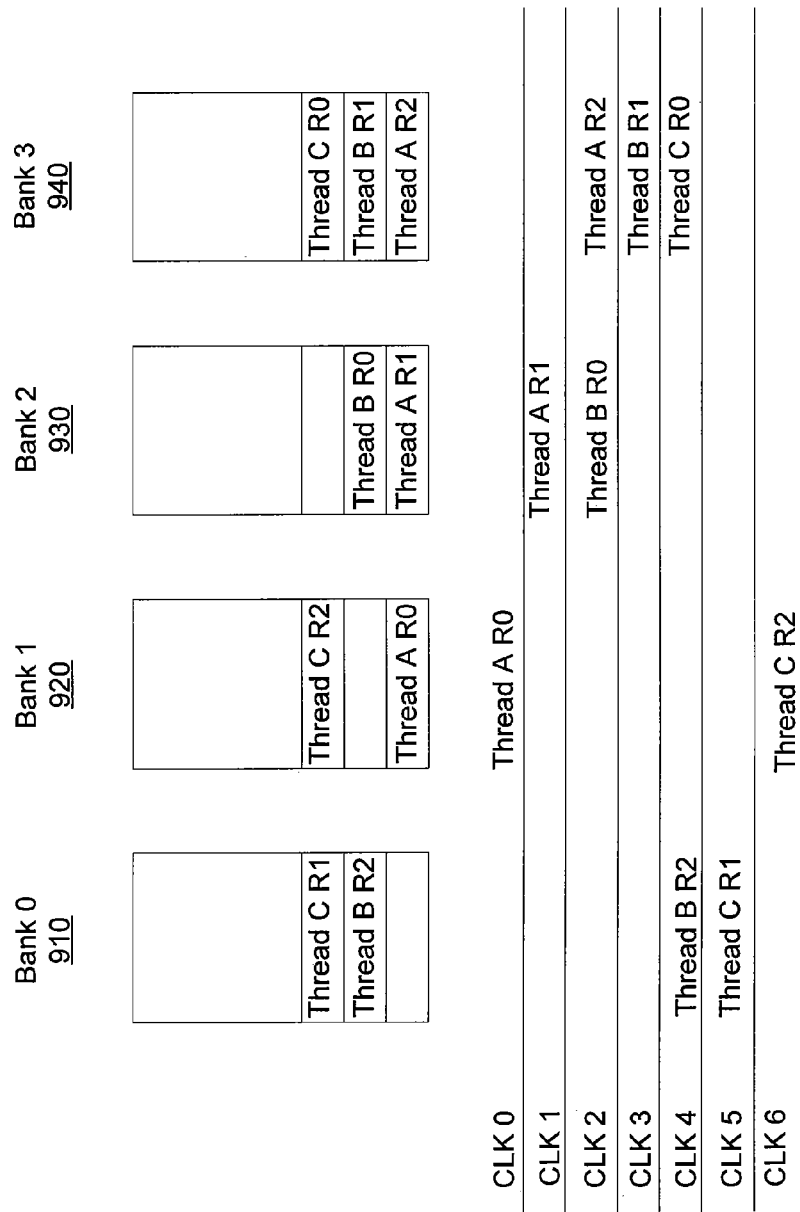
FIG. 9 is another timing diagram illustrating the transfers of operands according to an embodiment of the present invention.

FIG. 9 is another timing diagram illustrating the transfers of operands according to an embodiment of the present invention. Again, in various embodiments of the present invention, this diagram shows the transfer of operands from memory banks to a crossbar, while in others this shows transfers from the crossbar to the collectors.

In this example, operands are stored in a fat format in four banks, bank 0 910, bank 1 920, bank 2 930, and bank 3 940.

The starting address for each thread is rotated, as described above, in this example. Accordingly, the first operand for thread A is stored in bank 1 920, the first operand for thread B is stored in bank 2 930, and the first operand for thread C is stored in bank 3 940.

Initially, an instruction (not shown) to execute thread A is received. Accordingly, during a first clock cycle, CLK 0, a first operand in register R0 for thread A is transferred. Again, the collectors can only collect one operand for each thread during each clock cycle, so no other operands for thread A are transferred during this clock cycle. Accordingly, during a second clock cycle, a second operand in register R1 for thread A is transferred. Subsequently, a third operand is transferred. Other operands are transferred as shown. As can be seen, only one operand per thread is transferred each clock cycle. Again, in other embodiments of the present invention, more than one bus is provided to the collectors, so that more than one operand may be received by each collector during a clock cycle.

In this example, it will be noticed that data is not transferred during each clock cycle, that is, there are several free slots that could be filled with operand transfers. In a practical embodiment of the present invention, many threads are undergoing execution at any given time, and operands for other threads (not shown) can be transferred during these free slots.

Also in this example, only three operands are stored for each thread A, B, and C. However, in this embodiment, registers are allocated in multiples of four. When a thread uses less than an even multiple of four, some registers are empty and therefore wasted. Accordingly, an embodiment of the present invention may employ what is referred to as a packed fat allocation, where the first operand for a thread is placed in the register file adjacent to the last operand for the previous thread. An example of such a packed fat allocation is shown in the FIG. 10.

Figure 10:
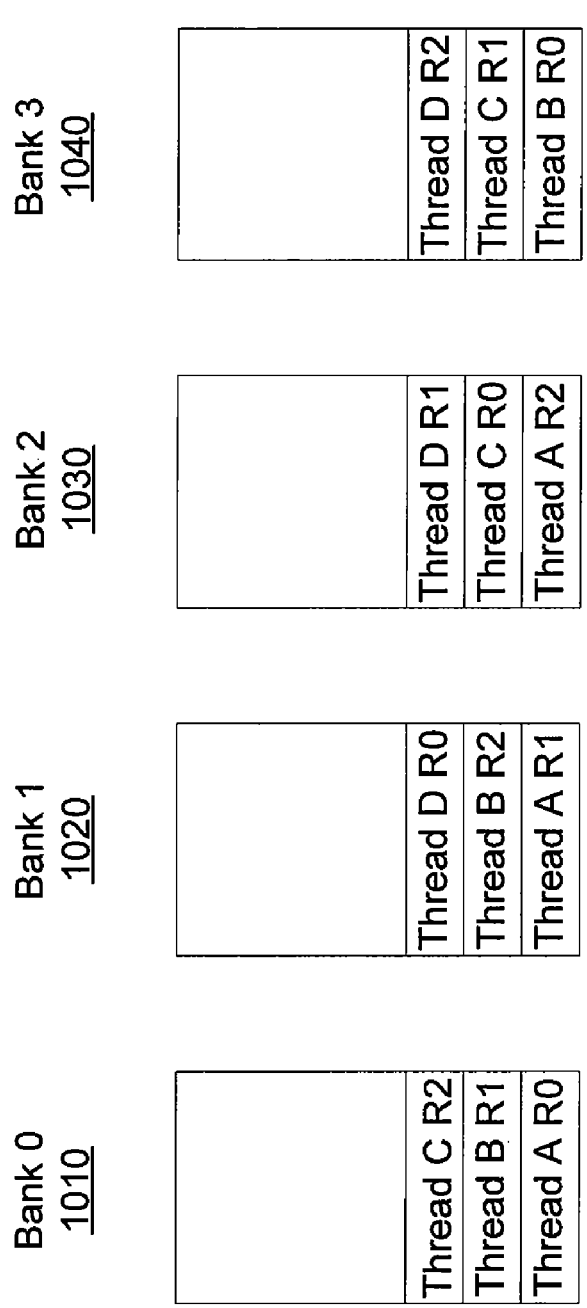
FIG. 10 illustrates a packed fat register allocation according to an embodiment of the present invention.

FIG. 10 illustrates a packed fat register allocation according to an embodiment of the present invention. In this example, three operands for threads A, B, C, and D are stored in four banks, banks 0 1010, bank 1 1020, bank 2 1030, and bank 3 1040. As can be seen, operands for thread A are stored in bank 0 1010, bank 1 1020, and bank 2 1030. A first operand for thread B is stored in the next available register, that is, in bank 3 1040. Subsequent operands for thread B are stored in bank 0 1010 and bank 1 1020. A first operand for thread C is stored in the next available register, which is in bank 2 1030. Subsequent operands are stored in bank 3 1040 and bank 0 1010. Again, a first operand for thread D is stored in the next available register, in bank 1 1020.

Operands can be stored in these banks in a variety of ways. In some embodiments of the present invention, threads storing operands in a fat register allocation store operands from the top (higher addresses) down, while in other embodiments, they are stored form the bottom (lower addresses) up. Similarly, threads storing operands in a thin register allocation can store operands in either manner. Alternately, operands can be stored in either allocation method by starting in the middle of the banks. Moreover, different types of threads using fat or thin allocation can store operands in different ways. In a specific embodiment of the present invention, pixel threads use either thin or fat file allocation, and store operands from the bottom up. Vertex and geometry threads, on the other hand, use fat allocation, and store operands from the top down. Alternately, vertex and geometry threads use thin allocation instead of fat, but still store operands from the top down. In other embodiments of the present invention, other combinations of thin and fat file allocation and top-down or bottom-up storage can be used.

Each of these two methods of allocation, thin and fat, has its own advantages and disadvantages. Thin allocation provides for simple scheduling and avoids conflicts well. However, in some cases, such a vertex processing, some threads can use a very large number of operands. If this large number of operands is stored in one bank using thin allocation, that bank used is essentially taken out of circulation for all other threads. Accordingly, remaining threads are left to share the remaining banks, which increases the possibility of a bank conflict. Also, threads employing a large number of operands may not fit well using a thin allocation, and a large number of register is may be unused. As a simple example, a large number of threads may be running, were each thread needs a number of registers that is slightly more than half of the number of registers available in the bank. In an example with four banks, only operands for four threads can be stored, and nearly half of the registers in each bank would go unused. In these situations fat allocation can be used, but again the likelihood of bank conflicts rise. Accordingly, a hybrid of these two allocation methods may be used. An example of such a hybrid register allocation is shown in the FIG. 11.

Figure 11:
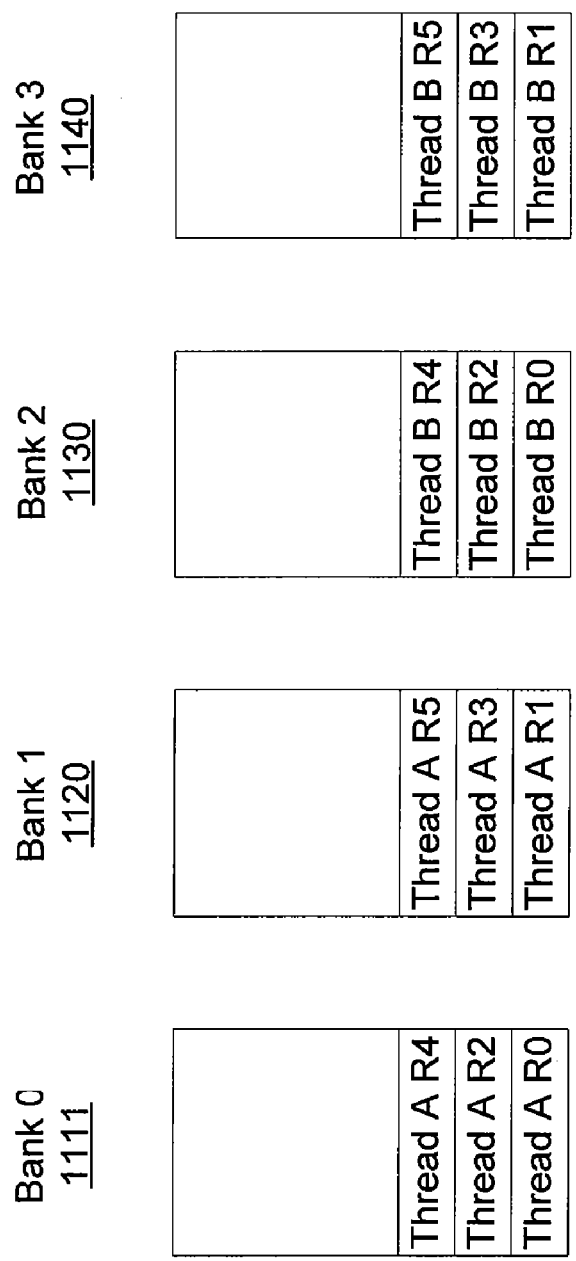
FIG. 11 illustrates a hybrid register allocation according to an embodiment of the present invention.

FIG. 11 illustrates a hybrid register allocation according to an embodiment of the present invention. In this example, operands for thread A are stored in bank 0 1111 and bank 1 1120, while operands for thread B are stored in bank 2 1130 and bank 3 1140. In this way, some of the bank conflict avoidance of the thin register allocation and some of the improved packing of the fat register allocation methods are realized. Just as thin and fat allocation methods can be combined, this hybrid method can be combined with either or both the thin and fat register allocation methods. For example, thin allocation can be used for threads using the least number of registers, fat allocation for those using the most, and hybrid for those using an intermediary number of registers.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A method of storing data in a multi-bank memory comprising:

for a process requiring a number of registers for storing data, determining whether the number of required registers is less than a threshold number; and if it is, then storing the data for the process in one bank in a multi-bank memory; else storing the data in each bank of the multi-bank memory.

2. The method of claim 1 wherein the multi-bank memory is a register file.

3. The method of claim 2 wherein the register file is formed on a graphics processing integrated circuit.

4. The method of claim 1 wherein the data comprises operands for use in executing instructions.

5. The method of claim 1 wherein the threshold number is programmed.

6. The method of claim 1 wherein each bank in the multi-bank memory is a single-ported memory.

7. The method of claim 1 wherein the multi-bank memory has a top and a bottom, and when data for the process is to be stored using every bank, it is stored from the top of the multi-bank memory.

8. The method of claim 4 further comprising:
reading the data, wherein if the data is stored in one bank of the multi-bank memory, then one operand is read each clock cycle, and if the data is stored in each bank of the multi-port memory, multiple operands are read each clock cycle.

9. An integrated circuit comprising:
a plurality of memory banks;
a plurality of collectors to collect data read from the plurality of memory banks;
a plurality of execution units to receive the collected data and instructions and to process the instructions using the collected data and to store results in the plurality of memory banks,
where the results for a process can be written either to one of the plurality of memory banks or to each of the plurality of memory banks, and
where the results for a process are written either to one of the plurality of memory banks or to each of the plurality of memory banks based on the number of results for the process.

10. The integrated circuit of claim 9 wherein the plurality of memory banks has a top and a bottom and when the registers are allocated to each of the plurality of memory banks, they are allocated from the top of the plurality of memory banks, and when registers are allocated to one of the plurality of memory banks, they are allocated from the bottom of the plurality of memory banks.

11. The integrated circuit of claim 9 where the results for a process can be written to one of the plurality of memory banks, to each of the plurality of memory banks, or to more than one but less than all the plurality of memory banks.

12. The integrated circuit of claim 9 further comprising:
a memory interface to receive the instructions from a memory.

13. The integrated circuit of claim 9 wherein the memory banks are single-ported memories.

14. The integrated circuit of claim 9 wherein the data read from the memory banks comprises operands.

15. The integrated circuit of claim 9 wherein each execution unit is a single-instruction, multiple-data unit.

16. A method of storing data in a multi-bank memory comprising a plurality of memory banks, the method comprising:
for a process requiring a number of registers for storing data, determining how to allocate the number of registers among the plurality of memory banks,
where the registers may be allocated in one bank of the plurality of memory banks;
the registers may be allocated in each bank of the plurality of memory banks, and
the registers may be allocated among more than one but less than all of the memory banks in the plurality of memory banks,
wherein the multi-bank memory has a top and a bottom and when the registers are allocated to each bank, they are allocated from the top of the multi-bank memory, and when registers are allocated to one bank, the are allocated from the bottom of the multi-bank memory.

17. The method of claim 16 wherein the multi-bank memory is a register file.

18. The method of claim 17 wherein the register file is formed on a graphics processing integrated circuit.

19. The method of claim 16 wherein the registers store operands for use in executing instructions.

20. The method of claim 16 wherein each bank in the multi-bank memory is a single-ported memory.

21. The method of claim 20 wherein each bank in the multi-bank memory is a single-ported memory clocked by a first higher-frequency clock such that one read operation and one write operation can be performed in one clock cycle of a second, lower-frequency clock.

22. The method of claim 16 wherein the top of the multi-bank memory corresponds to lower memory addresses, and the bottom of the multi-bank memory corresponds to higher memory addresses.

23. The method of claim 16 wherein the top of the multi-bank memory corresponds to higher memory addresses, and the bottom of the multi-bank memory corresponds to lower memory addresses.

24. The method of claim 23 wherein when registers are used by a vertex or geometry thread, they are allocated to each bank from the top of the multi-bank memory, and when registers are used by a pixel thread, they are allocated from the bottom of the multi-bank memory.

* * * * *